US010631063B2

(12) United States Patent
Hines

(10) Patent No.: US 10,631,063 B2
(45) Date of Patent: *Apr. 21, 2020

(54) SYSTEMS AND METHOD FOR USING CLOSED CAPTIONS TO INITIATE DISPLAY OF RELATED CONTENT ON A SECOND DISPLAY DEVICE

(71) Applicant: Google LLC, Mountain View, CA (US)

(72) Inventor: Steven Keith Hines, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 212 days.

This patent is subject to a terminal disclaimer.

(21) Appl. No.: 15/948,887

(22) Filed: Apr. 9, 2018

(65) Prior Publication Data

US 2018/0227641 A1 Aug. 9, 2018

Related U.S. Application Data

(63) Continuation of application No. 15/159,734, filed on May 19, 2016, now Pat. No. 9,942,617, which is a (Continued)

(51) Int. Cl.
*G06F 15/16* (2006.01)
*H04N 21/488* (2011.01)
(Continued)

(52) U.S. Cl.
CPC ....... *H04N 21/4884* (2013.01); *H04N 7/0882* (2013.01); *H04N 21/4122* (2013.01);
(Continued)

(58) Field of Classification Search
USPC ....... 709/203, 206, 207, 217, 219, 220, 223, 709/224, 226, 228, 230, 232, 238
See application file for complete search history.

(56) References Cited

U.S. PATENT DOCUMENTS 6,018,768 A 1/2000 Ullman et al.
6,388,714 B1 5/2002 Schein et al.
(Continued)

FOREIGN PATENT DOCUMENTS

CN 1605199 A 4/2005
CN 101179681 A 5/2008
(Continued)

OTHER PUBLICATIONS

Google Inc., Communiction pursuant to Article 94(3) EPC, EP 12789516.7, dated Jul. 15, 2015, 4 pgs.
(Continued)

*Primary Examiner* — Quang N Nguyen
(74) *Attorney, Agent, or Firm* — Morgan, Lewis & Bockius LLP

(57) ABSTRACT

This application discloses a method for using closed captions to initiate display of related content. A computer system identifies a set of first information in closed captions of a video stream, and searches an identity database using the set of first information as queries. The identity database stores a plurality of identities, and each identity is associated with a name and an importance metric. The computer system identifies one or more identities in the identity database based on the respective importance metrics of the one or more identities, and obtains second information of one or more content files related to the identities identified in the identity database. Upon obtaining the second information, the computer system generates instructions to invoke an application for presenting the second information of the one or more content files to the user of the computing device.

20 Claims, 12 Drawing Sheets

Related U.S. Application Data continuation of application No. 14/500,761, filed on Sep. 29, 2014, now Pat. No. 9,357,271, which is a continuation of application No. 13/927,015, filed on Jun. 25, 2013, now Pat. No. 8,849,959, which is a continuation of application No. 13/171,326, filed on Jun. 28, 2011, now Pat. No. 8,484,313.

(60) Provisional application No. 61/490,005, filed on May 25, 2011.

(51) Int. Cl.

| | | |
|---|---|---|
| *H04N 21/81* | (2011.01) | |
| *H04N 21/431* | (2011.01) | |
| *H04N 21/478* | (2011.01) | |
| *H04N 21/4782* | (2011.01) | |
| *H04N 21/6543* | (2011.01) | |
| *H04N 21/434* | (2011.01) | |
| *H04N 21/658* | (2011.01) | |
| *H04N 7/088* | (2006.01) | |
| *H04N 21/41* | (2011.01) | |
| *H04N 21/44* | (2011.01) | |
| *H04L 29/06* | (2006.01) | |
| *H04L 29/08* | (2006.01) | |
| *H04N 21/4722* | (2011.01) | |

(52) U.S. Cl.
CPC ..... *H04N 21/4316* (2013.01); *H04N 21/4348* (2013.01); *H04N 21/44008* (2013.01); *H04N 21/4782* (2013.01); *H04N 21/47815* (2013.01); *H04N 21/6543* (2013.01); *H04N 21/6581* (2013.01); *H04N 21/812* (2013.01); *H04N 21/8133* (2013.01); *H04N 21/8173* (2013.01); *H04L 65/4015* (2013.01); *H04L 67/02* (2013.01); *H04L 67/14* (2013.01); *H04N 21/4722* (2013.01); *H04N 21/4886* (2013.01)

(56) References Cited

U.S. PATENT DOCUMENTS

| | | | |
|---|---|---|---|
| 8,095,610 B2 * | 1/2012 | Gould | H04W 4/029 709/207 |
| 8,249,423 B2 | 8/2012 | Ekstrand | |
| 8,582,565 B1 | 11/2013 | Morsy et al. | |
| 8,621,505 B2 | 12/2013 | Petronelli et al. | |
| 2003/0110507 A1 | 6/2003 | Dimitrova et al. | |
| 2003/0163816 A1 | 8/2003 | Gutta et al. | |
| 2004/0268419 A1 | 12/2004 | Danker et al. | |
| 2006/0050794 A1 | 3/2006 | Tan et al. | |
| 2007/0040936 A1 | 2/2007 | Park | |
| 2007/0083887 A1 | 4/2007 | Gutta et al. | |
| 2007/0136777 A1 | 6/2007 | Hasek et al. | |
| 2007/0214488 A1 | 9/2007 | Nguyen et al. | |
| 2007/0234397 A1 | 10/2007 | Pearson et al. | |
| 2008/0065602 A1 * | 3/2008 | Cragun | G06F 16/3334 |
| 2008/0111822 A1 | 5/2008 | Horowitz et al. | |
| 2008/0112690 A1 | 5/2008 | Shahraray et al. | |
| 2008/0204595 A1 | 8/2008 | Rathod et al. | |
| 2008/0276266 A1 | 11/2008 | Huchital | |
| 2009/0062424 A1 | 3/2009 | Biniak et al. | |
| 2009/0235312 A1 | 9/2009 | Morad et al. | |
| 2009/0244372 A1 | 10/2009 | Petronelli et al. | |
| 2010/0086284 A1 | 4/2010 | Chung | |
| 2010/0088718 A1 | 4/2010 | Hasek et al. | |
| 2010/0100581 A1 * | 4/2010 | Landow | H04L 67/02 709/203 |
| 2010/0121936 A1 * | 5/2010 | Liu | H04N 5/44543 709/217 |
| 2010/0157151 A1 | 6/2010 | Lee | |
| 2011/0113438 A1 | 5/2011 | Patil et al. | |
| 2011/0321098 A1 | 12/2011 | Bangalore et al. | |
| 2012/0233646 A1 | 9/2012 | Coniglio et al. | |
| 2012/0303742 A1 | 11/2012 | Hines | |
| 2013/0058480 A1 | 3/2013 | Ziskind et al. | |
| 2014/0032635 A1 | 1/2014 | Pimmel et al. | |
| 2014/0098177 A1 | 4/2014 | Morsy et al. | |
| 2014/0098715 A1 | 4/2014 | Morsy et al. | |

FOREIGN PATENT DOCUMENTS

| | | |
|---|---|---|
| CN | 101529500 A | 9/2009 |
| CN | 101682729 A | 3/2010 |

OTHER PUBLICATIONS

Google Inc., Communiction pursuant to Article 94(3) EPC, EP 14724841.3, dated Jun. 16, 2016, 7 pgs.

Google Inc., International Preliminary Report on Patentability, PCT/US2012/039194, dated Dec. 5, 2013, 7 pgs.

Google Inc., International Search Report / Written Opinion, PCT/US2012/039194, dated Nov. 30, 2012, 9 pgs.

Google Inc., International Search Report / Written Opinion, PCT/US2014/026612, dated Jul. 10, 2014, 9 pgs.

Google Inc., Notification of First Office Action, CN 201280036340.9, dated Apr. 25, 2016, 7 pgs.

Google Inc., Supplementary European Search Report, EP 12789516.7, dated Oct. 23, 2014, 6 pgs.

Google Inc., European Examination Report, EU Patent Application No. 14724841.3, dated Mar. 30, 2017, 6 pgs.

* cited by examiner

SYSTEMS AND METHOD FOR USING CLOSED CAPTIONS TO INITIATE DISPLAY OF RELATED CONTENT ON A SECOND DISPLAY DEVICE

RELATED APPLICATIONS

This application is a continuation of and claims benefit of priority to U.S. patent application Ser. No. 15/159,734, filed May 19, 2016, issued as U.S. Pat. No. 9,942,617 on Apr. 10, 2018, entitled "Systems and Method for using Closed Captions to Initiate Display of Related Content on a Second Display Device," which is a continuation of and claims benefit of priority to U.S. patent application Ser. No. 14/500,761, filed Sep. 29, 2014, issued as U.S. Pat. No. 9,357,271 on May 31, 2016, entitled "Systems and Method for using Closed Captions to Initiate Display of Related Content on a Second Display Device," which is a continuation of and claims benefit of priority to U.S. patent application Ser. No. 13/927,015, filed Jun. 25, 2013, issued as U.S. Pat. No. 8,849,959 on Sep. 30, 2014, entitled "Systems and Method for using Closed Captions to Initiate Display of Related Content on a Second Display Device," which is a continuation of and claims benefit of priority to U.S. patent application Ser. No. 13/171,326, filed Jun. 28, 2011, issued as U.S. Pat. No. 8,484,313 on Jul. 9, 2013, entitled "Using a Closed Caption Stream for Device Metadata," which is a non-provisional application of and claims benefit of priority to U.S. Provisional Application No. 61/490,005, filed May 25, 2011. Content of each of the above applications is hereby incorporated by reference in its entirety.

TECHNICAL FIELD

The present description relates generally to providing information to a user.

BACKGROUND

Video content sometimes includes auditory or visual messages that prompt viewers to take some action relating to the content of the video. For example, a television commercial may prompt a user to visit a product's website associated with an advertised product to obtain coupons or information about the product. In another example, during the broadcast of a television program or movie, a message may appear prompting a viewer to visit a website to view more information about the people, places or things depicted in or associated with the television program or movie. Even without being prompted to, many users are interested in a person, place or thing related to the video content they are watching. Typically, to obtain information relevant to a video stream, a user would need to visit a website using an Internet-enabled device. Existing methods are inefficient because they require users to take some action that is outside the viewing experience. Also many viewers may miss or ignore audio messages and visual messages that provide additional information about video content, and it may be inconvenient for many viewers to operate a computing device while viewing video content.

SUMMARY

The methods and systems described herein provide an effective way to display information relevant to video content while a user is viewing the video content. For example, a commercial about tea may be displayed on a display device and while the user is viewing the commercial, a client device connected to the display device parses the closed caption content to obtain a set of information, sends the set of information to a server, obtains a set of instructions from the server and performs one or more functions in accordance with the received set of instructions. The one or more functions display information relating to the closed caption content. In this example, the set of instructions include instructions to execute one or more applications such as a browser to display a web page with information about a particular type or brand of tea, a media player to show an instructional video on preparing tea, a feed reader application to display articles about tea, or a coupon book application to present coupons for the tea that was the subject of the commercial. The one or more applications are executed while the commercial is being played and the one or more applications are concurrently displayed with the commercial on the display device.

In some implementations, a method for using closed captions to initiate display of related content on a second display device includes: obtaining a video stream that is configured to be displayed on a first display device. The video stream includes closed captions. In some implementations, the method also includes: identifying one or more symbols or words included in the closed captions; and obtaining a set of instructions. The set of instructions includes instructions to display content information relating to at least one symbol or word in the one or more symbols or words. The method further includes: in response to obtaining, and in accordance with, the set of instructions, executing one or more applications based on a type of the content information; and formatting for display, on a second display device, output from the one or more applications. In some implementations, the one or more applications include at least a content viewing application.

In some implementations, a method for using closed captions to initiate display of related content on a second display device includes: obtaining a video stream including closed captions that is configured to be displayed on a first display device; forwarding to a server one or more symbols or words included in the closed captions; and obtaining from the server a set of instructions related to the one or more symbols or words. In some implementations, the set of instructions includes instructions to display on a second display device different from the first display device content information relating to at least one of the one or more symbols or words. The method further includes, in response to obtaining, and in accordance with, the set of instructions, executing one or more respective applications based on a type of the content information; and formatting for display on the second display device output from the one or more applications. In some implementations, the applications include one of: a web browser, a music application, a feed reader application, a coupon application, and a content viewer.

BRIEF DESCRIPTION OF THE DRAWINGS

Like reference numerals refer to corresponding parts throughout the drawings.

DETAILED DESCRIPTION

Figure 1:
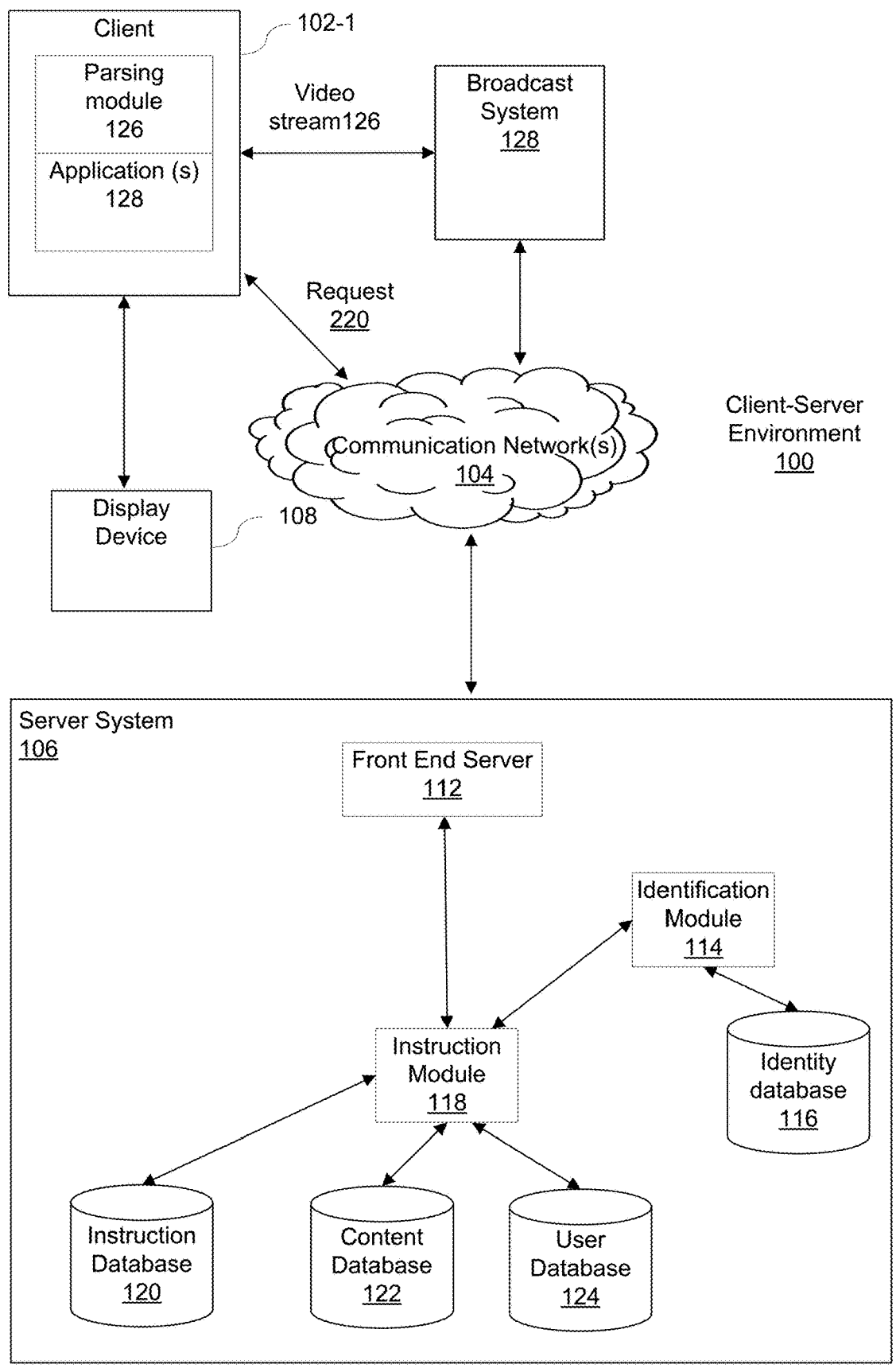
FIG. 1 is a block diagram illustrating a distributed client-server system in accordance with some implementations.

FIG. 1 is a block diagram illustrating the distributed system 100 implemented for some of the implementations. The client-server system 100 includes: one or more client devices 102, a communication network 104, a server system 106, a display device 108 and a broadcast system 128. The server system 106 is coupled to the one or more client devices 102 and the broadcast system 128 by the communication network 104.

The broadcast system 128 broadcasts the video streams to the one or more client devices 102. The server system 106 receives a request containing a set of information derived from closed caption content, determines a set of instructions based on the set of information and sends the set of instructions to the client device 102 for execution. When executed by the client device 102, the set of instructions cause the client device 102 to display information relating to the set of information extracted from the closed captions of a video stream.

According to some implementations, a video or video stream is a sequence of images or frames representing scenes with objects in motion. A video displays a number of images or frames per second. For example, a video commonly displays 30 frames per second. In contrast, a still image as used herein stands alone, is static or still and does not include motion or change as a video typically does. An image herein can be included or embedded within a larger image or a video.

Closed captioning refers to the ability to display caption text to select members of an audience. Closed captions typically display a transcription of the audio portion of a program as it occurs or with slight delay (either verbatim or in edited form), sometimes including non-speech elements. The term "closed" in closed captions indicates that not all viewers can see the caption. Only users who choose to decode or activate closed captions are able to view them. Closed captions are distinguished from open captions, which are visible to all users. Closed captions are also distinguished from subtitles. Subtitles assume a viewer can hear but cannot understand the language or accent, so subtitles only transcribe dialogue and some on-screen text. Closed captions aim to describe to the deaf and hard of hearing all significant audio content including spoken dialogue, music, sound effects, and non-speech information such as the identity of speakers and their manner of speaking. Closed captions are sometimes created by the content creator or broadcaster of the content.

In some implementations, the server system 106 is implemented as a single server system, while in other implementations it is implemented as a distributed system of multiple servers. Solely for convenience of explanation, the server system 106 is described below as being implemented on a single server system. In some implementations, the broadcast system 128 is implemented as a single server system, while in other implementations it is implemented as a distributed system of multiple servers. Solely for convenience of explanation, the broadcast system 128 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the one or more client devices 102 and the server system 106. In some implementations, the communication network 104 uses the HyperText Transport Protocol (HTTP) to transport information using the Transmission Control Protocol/Internet Protocol (TCP/IP). HTTP permits client devices 102 to access various resources available via the communication network 104. The various implementations, however, are not limited to the use of any particular protocol.

In some implementations, the server system 106 includes a front end server 112 that facilitates communication between the server system 106 and the network 104. In some implementations, the front end server 112 is configured to receive a request for a set of instructions. In some implementations, the front end server 112 is configured to send a set of instructions to a requesting client device 102. In some implementations, the front end server 112 is configured to send content files or and links to content files or content files. In this context, the terms "content file" means any electronic file of any format including, but not limited to, a video file, an image file, a music file, a web page, an email message, an SMS message, a content feed, an advertisement, a coupon, a playlist and an XML content file. In some implementations, the front end server 112 is also configured to send a video stream to a client 102.

A content feed (or channel) is a resource or service that provides a list of content items that are present, recently added, or recently updated at a feed source. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Content file Format (PDF) content files, and so forth.

In some implementations, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other implementations, other content syndication formats, such as the Atom syndication format or the VCALENDAR calendar format, may be used to specify content feeds.

In some implementations, the server system 106 includes an identity database 116 that stores one or more relevant identities and associated metrics. An identity can represent a person, place or thing and the associated metrics measure the importance of the respective identity. In some implementations, the identity database 116 is a distributed database.

In some implementations, the server system 106 includes an identification module 114 that manages and retrieves information stored in the identity database 116. The identification module 114 receives requests and returns identities stored in the identity database 116 that match the request.

In some implementations, the server system 106 includes a user database 124 that stores user data. The user data for a respective user includes a user identifier, associated content files and preferences. In some implementations, the user database 124 is a distributed database.

In some implementations, the server system 106 includes a content database 122. In some implementations, the content database 122 stores videos, images, music, web pages, email messages, SMS messages, content feeds, advertisements, coupons, playlists XML content files. In some implementations, the content database 122 stores links to videos, images, music, web pages, email messages, SMS messages, content feeds, advertisements, coupons, playlists XML content files. In some implementations, the content database 122 is a distributed database.

In some implementations, the server system 106 includes an instruction module 118 that generates a set of instructions to be executed by a client device 102. The instruction module 118 generates a set of instructions based on information contained in a request 220 and/or information the user database 124. In some implementations, the instruction module 118 selects one or more content files and/or one or more links to content files based on a set of information contained in a request. The instruction module 118 sends the one or more content files and/or the one or more links to content files to the front end server 112 for transmission to a requesting client device 102.

Figure 3:
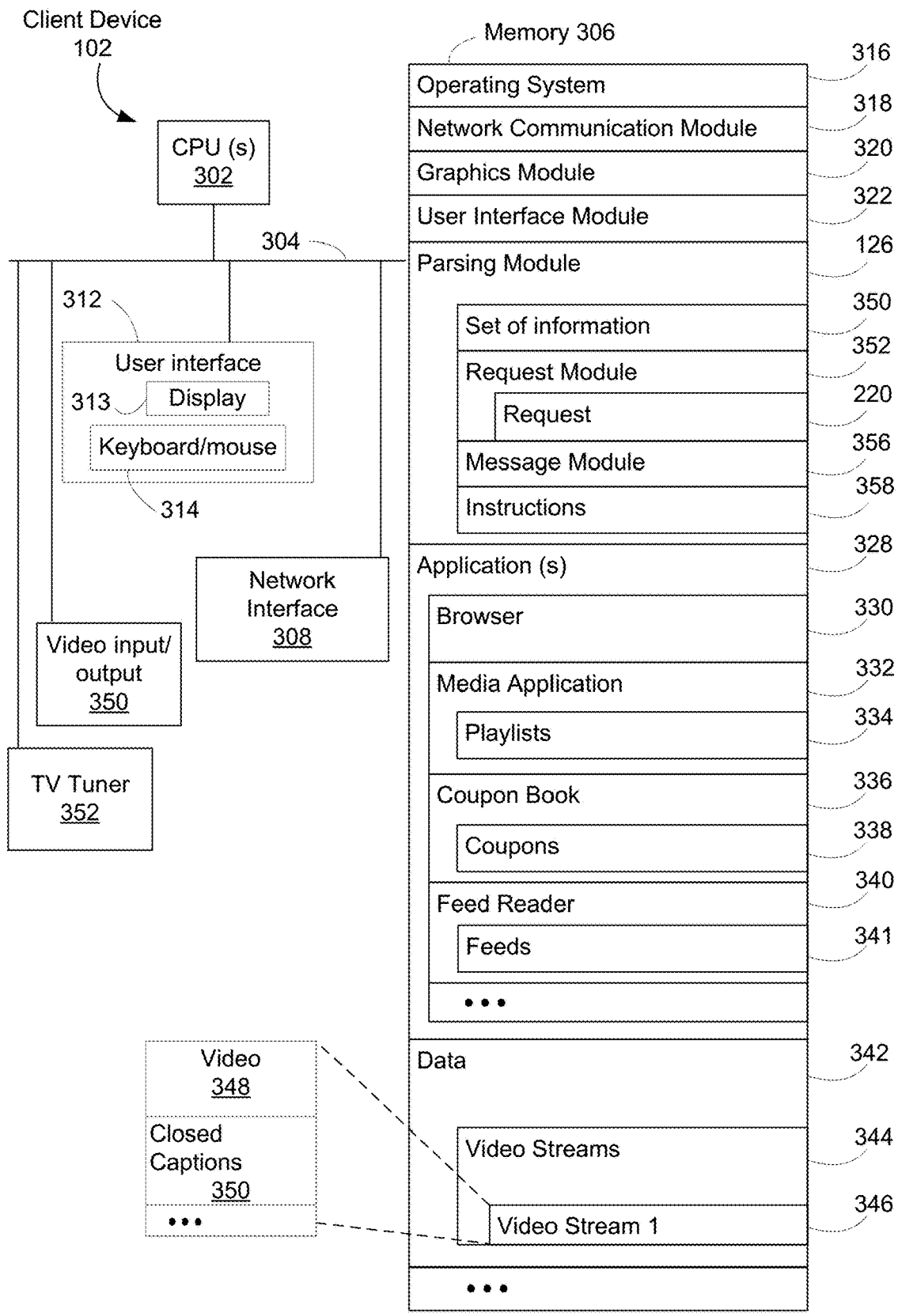
FIG. 3 is a block diagram illustrating the structure of an exemplary client device according to some implementations.

In some implementations, a user interacts with the server system 106 via a client device 102. The client devices 102 may be any suitable computer device that is capable of connecting to the communication network 104, such as a desktop computer, laptop computer, tablet device, netbook, internet kiosk, personal digital assistant, mobile phone, gaming device, or any other device that is capable of communicating with the server system 106. The client devices 102 typically include one or more processors, non-volatile memory such as a hard disk drive or flash drive and a display. In some implementations, the client devices 102 have input devices such as a keyboard and a mouse (as shown in FIG. 3). In some implementations, the client devices 102 have touch screen displays and/or microphones for input. In some implementations, the client device is connected to a projector. In some implementations, the client device 102 is connected to a display device 108. In some implementations, the client device 102 includes the display device 108. Stated in another way, in some implementations, the client device and the display device are contained in a single device. In some implementations, the display device 108 is a television or a screen, such an LCD or LED display.

In some implementations, the client devices 102 receive video streams 125 from one or more broadcast systems 128. In some implementations, the client device 102 receives video streams from cable television inputs, satellite receivers, from a network connection or from an over-the-air antenna.

Figure 2A:
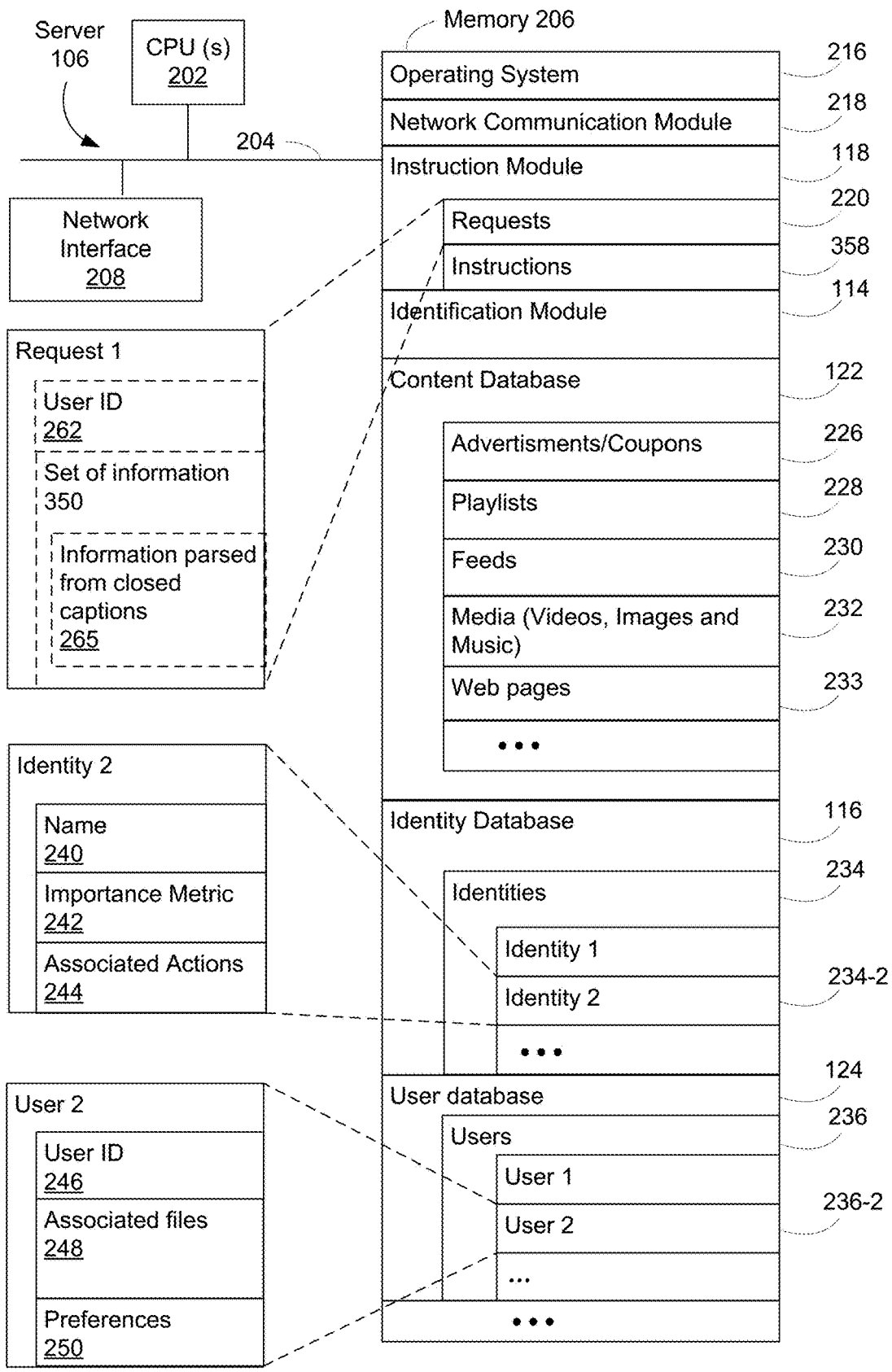
FIG. 2A is a block diagram illustrating the structure of an exemplary server system according to some implementations.

FIG. 2A is a block diagram illustrating a server system 106, in accordance with one implementation of the present implementation. The server system 106 typically includes one or more processing units (CPU's) 202, one or more network or other communications interfaces 208, memory 206, and one or more communication buses 204 for interconnecting these components. Memory 206 includes high-speed random access memory, such as DRAM, SRAM, DDR RAM o other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a computer readable storage medium. In some implementations, memory 206 or the non-transitory computer readable storage medium of memory 206 store the following programs, modules and data structures, or a subset thereof including an operation system 216, a network communication module 218, a identification module 114, a identity database 116, a instruction module 118, a content database 122 and a user database 124.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The identity database 116 stores one or more identities 234. A respective identity 234-2 includes a name 240, an importance metric 242 and associated actions 244. The name 240 identifies the identity. For example, a name 240 could be the name of a person, place or thing. The importance metric 242 measures the importance of the identity and is used to determine which identity among a set of identities is most important. The associated actions 244 specify one or more actions such as sending a message, displaying a message and executing an application. In some implementations, the associated action 244 specifies one or more content files in the content database 122.

The content database 122 stores content files and/or links to content files. In some implementations, the content database 122 stores media 232 such as videos, images and music. In some implementations, the content database 122 stores advertisements 226, coupons 226, playlists 228, content feeds 230 and XML content files. In some implementations, the content database 122 stores web pages 233, email messages and SMS messages. In some implementations, the content database 122 includes links to videos, images, music, web pages, email messages, SMS messages, content feeds, advertisements, coupons, playlists and XML content files. In some implementations, at the content files in the content database 122 include a metric measuring the popularity of the respective content file.

The user database 124 stores user data 236 for one or more users. In some implementations, the user data 236-2 for a respective user includes a user identifier 246 and associated files 248. In some implementations, user data 236-2 for a respective user includes preferences 250. The user identifier 230 identifies a user. In some implementations, the associated files 248 comprise a list of identifiers of content files stored in the content database 122 that are associated with the user. The files 248 associated with the user can include any file stored in the content database 122. In some implementations, the preferences 250 include categories of information in which the user is or is not interested. For example, a user may have no interest in sports and an interest in science fiction. In some implementations, the preferences 250 include counts for categories for interest. For example, each category may include a number or score representing the number of times a user has viewed an item associated with the category. In some implementations, the preferences 250 indicate one or more applications that the user prefers or does not prefer. For example, the preferences 250 may indicate that the user prefers to have songs added to user's playlist. In another example, the preferences 250 may indicate that the user prefers not to receive coupon offers.

The instruction module 118 generates a set of instructions 358 based on information contained in a request and sends the set of instructions to a client 102.

In some implementations the instruction module 116 generates a set of instructions 358 in response to receiving a request 220 from a client 102. In some implementations, the request 220 includes a user identifier 262 and a set of information 350. The user identifier 262 identifies a user with whom the request is associated. For example, the user identifier 262 can be an IP address associated with a client device 102 or an alphanumeric value chosen by the user or assigned by the server that uniquely identifies the user. In some implementations, the set of information 350 includes information parsed from the contents of a closed caption stream 265.

In some implementations, the set of information 350 includes strings consisting of alphabet characters, numbers, symbols or any combination thereof. In some implementations, the set of information 350 includes the name of a person, place or thing, and additional information such as a name of an application. For example, the set of information 350 may include a name of a music artist and may indicate a media application. In some implementations, the set of information 350 includes the name of a video stream and/or the category of the video stream. For example, the set of information 350 may include the name of a movie and the category or genre of the movie (e.g., drama, science fiction etc.). In some implementations, the set of information 350 includes a set of instructions. In some implementations, the set of instructions include instructions to invoke one or more applications. In some implementations, the set of instructions include instructions to display and/or send one or more messages. In some implementations, the messages include email messages and SMS messages.

In some implementations, the instruction module 118 stores the set of information 350 received in a request 220 in the user database 124, and associates the set of information 350 with a user identified by the request 220. In some implementations, the set of information 350 contained in a request 220 from a respective user is used to determine preferences for the respective user. For example, the set of information 350 may contain category information (e.g., science fiction) of content a respective user has viewed. In this example, the instruction module 118 increments the respective category counts stored in the user preferences 250 for the respective user.

In some implementations, the instruction module 118 generates a set of instructions 358 based on information contained in a request 220. In some implementations, the instruction module 118 generates a set of instructions 358 based on the user preferences 250 and/or the set of information 350 contained in a request 220.

In some implementations, the instruction module 116 sends at least a portion of the set of information 350 to the identification module 114 to obtain one or more relevant identities 234. The identification module 114 matches information contained in the set of information 350 to one or more identities 234 in the identity database 116. In some implementations, the identification module 114 parses the set of information 350 to obtain parsed information and generates search queries with the parsed information. For example, a set of information 350 may include a list of proper nouns and the identification module 114 may construct a query with each proper noun. In some implementations, the set of information 350 includes one or more sentences, special characters and/or symbols. In some implementations, the one or more sentences are used as queries to the identity database 116. In some implementations, a predefined amount of text following a special character in the set of information 350 is used as a query to the identity database 116. For example, if the set of information 350 includes the text "#actor person x" the text "person x" would be used as a query.

The generated queries are sent to the identity database 116 to find potential matches. In some implementations, the identification module 114 filters the search results based on the importance metric 242 associated with the respective identities. For example, the identification module 114 may select identities that have an importance metric 242 above a predefined threshold or may select the top few identities among a set of identities. The identification module 114 sends one or more determined identities to the instruction module 118.

In some implementations, the instruction module 118 receives the one or more determined identities from the instruction module 118 and determines a set of instructions 358 based on the one or more determined identities. The instruction module 118 selects an identity from the one or more determined identities. For example, the instruction module 118 may select the identity with the highest associated importance metric 242. In some implementations, the selected identity is determined based on preferences 250 associated with the user identified by the user identifier 262. For example, the instruction module 118 may select one or more sports related identities when the user's preference indicates that the user has an affinity for sports.

After an identity is selected, the instruction module 118 generates a set of instructions 358. In some implementations, the instruction module 118 determines a set of instructions for each identity determined from the set of information 350. In some implementations, the set of instructions 358 is based on the associated action 244 for the selected identity. For example, if the selected identity is the name of a historical figure, the associated action 244 may specify showing a webpage with information about the historical figure. In some implementations, the set of instructions 358 is based on the one or more determined identities and user preferences 250 for the user identified by the user identifier 262. For example, a user's preferences 250 may indicate applications or actions that the user prefers or does not prefer. For example, a user may prefer that certain applications are not executed on the user's device. In another example, the user may prefer to receive information in a content feed.

In some implementations, the instruction module 118 uses the one or more determined identities returned by the identification module 118 to generate search queries to identify relevant content files in the content database 122. For example, if the one or more determined identities include the name of an actor, the instruction module 118 may determine content files such as web pages, videos, pictures and news stories that the actor is associated with and determines which one would be most interesting to a user based metrics associated with the content files. For example, the metrics may measure popularity or relevance.

In some implementations, the set of instructions 358 includes instructions to invoke one or more functions or applications on a client device 102. In some implementations, the one or more applications are selected from the group consisting of a media application, a feed reader application, a browser application and a coupon book application. In some implementations, the one or more applications are selected based on the one or more content files identified using the relevant identities. In some implementations, the set of instructions 358 includes instructions to invoke an application and instructions to direct the invoked application to download one or more content files contained in the content database 118. For example, the instruction module 118 may generate instructions to invoke a feed reader device and instructions to cause the feed reader device to download content items relating to the actor. In another example, the instruction module 118 may generate instructions to invoke a web browser and instructions to cause the browser to be navigated to a particular website (e.g., a product website). Additional examples of application execution are discussed in the discussion of FIGS. 5B, 5C, 5D and 5E.

In some implementations, the set of instructions 358 include instructions to display a message on the display 313 of the client device 102. In some implementations, the set of instructions 358 includes instructions to send an email message or SMS message to a user. The content of the email message or SMS is related to the set of information 350. For example, the message may contain a promotional offer relating to pronouns contained in the set of information 350.

The instruction module 118 generates and sends the set of instructions 358 to a client device 102 in response to a request from the client device 102. In some implementations, the instructions 358 generated by the instruction module 118 are contained in a content feed. In some implementations, the instructions module 118 retrieves and sends one or more content files and/or content file links (stored in the content database 122) with the set of instructions 358.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2A shows a server system, FIG. 2A is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2A could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

Figure 2B:
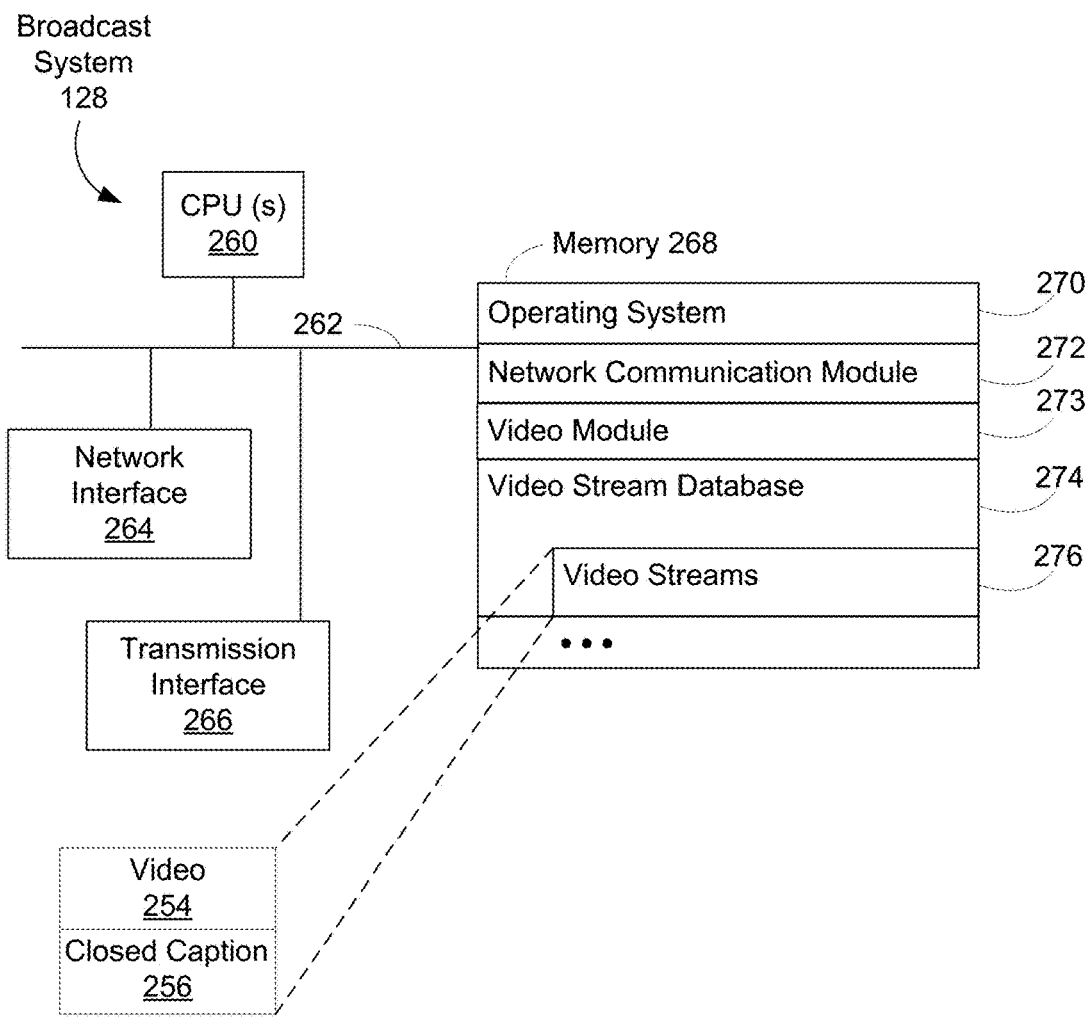
FIG. 2B is a block diagram illustrating the structure of an exemplary broadcast system according to some implementations.

FIG. 2B is a block diagram illustrating a broadcast system 128, in accordance with one implementation of the present implementation. The broadcast system 128 typically includes one or more processing units (CPU's) 358, one or more network or other communications interfaces 262, memory 268, a transmission interface 266 and one or more communication buses 262 for interconnecting these components. Memory 268 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 268 may optionally include one or more storage devices remotely located from the CPU(s) 358. Memory 268, including the non-volatile and volatile memory device(s) within memory 268, comprises a computer readable storage medium. In some implementations, memory 268 or the non-transitory computer readable storage medium of memory 268 store the following programs, modules and data structures, or a subset thereof including an operation system 270, a network communication module 272, a video module 273 and a video stream database 276.

The transmission interface 266 transmits video streams via radio transmissions, satellite transmissions or through cable lines.

The operating system 270 includes procedures for handling various basic system services and for performing hardware dependent tasks.

The network communication module 272 facilitates communication with other devices via the one or more communication network interfaces 350 (wired or wireless) and one or more communication networks, such as the Internet, other wide area networks, local area networks, metropolitan area networks, and so on. In some implementations, the network communication module 272 transfers video streams stored in the video stream database 268 via the network interface 350.

The video stream database 274 stores video streams 276. In some implementations, video streams 276 in the video stream database 274 include video content 254 and closed captions 256.

The video module 273 sends one or more video streams 276 stored in the video stream database 274 to one or more client devices 102.

In some implementations, the functionality of broadcast system 108 and server system 106 can be combined on a single server system.

Each of the above identified elements may be stored in one or more of the previously mentioned memory devices, and each of the modules or programs corresponds to a set of instructions for performing a function described above. The set of instructions can be executed by one or more processors (e.g., the CPUs 358). The above identified modules or programs (i.e., sets of instructions) need not be implemented as separate software programs, procedures or modules, and thus various subsets of these modules may be combined or otherwise re-arranged in various implementations. In some implementations, memory 268 may store a subset of the modules and data structures identified above. Furthermore, memory 268 may store additional modules and data structures not described above.

Although FIG. 2B shows a broadcast system, FIG. 2B is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 270 and network communication module 272) shown separately in FIG. 2B could be implemented on single servers and single items could be implemented by one or more servers. The actual number of servers used to implement the broadcast system 128 and how features are allocated among them will vary from one implementation to another, and may depend in part on the amount of data traffic that the system must handle during peak usage periods as well as during average usage periods.

FIG. 3 is a block diagram illustrating a client device 102, in accordance with some implementations. The client device 102 typically includes one or more processing units (CPU's) 302, one or more network or other communications interfaces 308, memory 306, and one or more communication buses 304, for interconnecting these components. The client device 102 may also include a user interface comprising a display device 313 and a keyboard and/or mouse (or other pointing device) 314. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a computer readable storage medium. In some implementations, the client device 102 is a portable electronic device with a touch screen display. In some implementations, memory 306 or the computer readable storage medium of memory 306 store the following programs, modules and data structures, or a subset thereof including operation system 316, network communication module 318, user interface module 322, parsing module 126, applications 328 and data 342.

The client device 102 includes a video input/output 350 for inputting and outputting video. In some implementations, the video input/output 350 is configured to receive video streams from radio transmissions, satellite transmissions and cable lines. In some implementations the video input/output 350 is connected to a cable box. In some implementations, the video input/output 350 is connected to a satellite dish. In some implementations, the video input/output 350 is connected to an antenna.

In some implementations, the client device 102 includes a television tuner 352 for receiving and recording television video streams.

The operating system 316 includes procedures for handling various basic system services and for performing hardware dependent tasks.

The network communication module 318 facilitates communication with other devices via the one or more communication network interfaces 304 (wired or wireless) and one or more communication networks, such as the Internet, other wide area networks, local area networks, metropolitan area networks, and so on.

The user interface module 322 tracks user input and selections to the client device 102.

The graphics module 320 displays the user interfaces associated with the applications 328.

The data 342 includes video streams 344. The video streams 344 include video content 348 and closed captions 350.

In some implementations, the applications 328 include a browser 330, a media application 332, a coupon book application 336 and a feed reader application 340. The browser 330 allows a user to view web pages. The media application 332 plays videos, music, displays images and manages playlists 334. The feed reader application 340 displays content feeds 341. The coupon book application 336 displays and stores coupons/advertisements 338.

The parsing module 126 parses closed captions in the video stream to generate a set of information, sends the set of information to a server 106, receives a set of instructions from the server 106 in response to sending the set of information and executes the set of instructions.

In some implementations, the parsing module 126 parses closed captions in a video stream to determine a set of information 350. The parsing module 126 parses the content of the closed captions. For example, if the closed captions included the text, "hello world," the parsing module would parse the text, "hello world." In some implementations, the closed captions include text, numbers, symbols or any combination thereof.

In some implementations, the parsing module 126 identifies one or more special characters in the closed captions. The special characters may be defined in a list that is stored in the parsing module 126. The special characters may be defined by the provider or broadcaster of a video stream. In some implementations, the parsing module 126 identifies one or more special characters and a predefined amount of text following the one or more special characters. The parsing module 126 includes the special characters and/or the predefined amount of text in the set of information 350. In some implementations, the special characters include symbols, numbers, text or any combination thereof. For example, a broadcaster or content provider may insert symbol "#" into a closed caption to emphasize that text following the symbol is relevant for generating a set of instructions. The text following the symbol may include instructions or may include information from which instructions should be derived. For example, a closed caption may include "#actor person x" to indicate that person x is an actor. By inserting special characters into the closed captioning of a video program, a content provider can provide relevant information to viewers of the video program while the video program is being played.

In some implementations, the parsing module 126 identifies sentences in closed captions and includes the identified sentences in the set of information 350. For example, the parsing module 126 may identify sentences by detecting periods or other punctuation marks in the closed captions. The parsing module 126 includes one or more of the identified sentences in the set of information 350.

In some implementations, the parsing module 126 identifies one or more proper nouns in the closed captions and includes the proper nouns in the set of information 350. For example, the parsing module 126 may select capitalized words in the closed captions. In some implementations, the one or more proper nouns are selected if they match one or more proper nouns stored in the parsing module 126. The proper nouns may correspond to a person, place or thing. For example, the parsing module 126 may parse the closed captions to determine the names of one or more people, the name of a product or company or the name of a country. The instruction module 118 can use this information to issue specific requests to the server 106, to return a link to a web page about the person, or place identified by the proper noun or to return a media playlist of media items (e.g., songs or movies) by or about the person identified by the proper noun.

In some implementations, the set of information 350 is sent to a server 106 in a request 220 generated by the request module 352. In some implementations, the request 356 includes a user identifier of a user of the client 102.

In response to sending the request 220, the parsing module 126 receives a set of instructions 358 from a server remotely located from the client 102. In some implementations, the set of instructions 358 are contained in a content feed. In some implementations the parsing module 126 receives one or more content files in response to the request.

The parsing module 126 executes the set of instructions 358 in response to receiving the set of instructions 358. In some implementations, the set of instructions 358 includes instructions to display a message on the display (e.g., 313 and 110). The content of the message relates to the set of information. For example, the message may offer a user a product or service relating to a video segment. In some implementations, the message is displayed by the message module 356. In some implementations, the set of instructions 358 includes instructions to send an email message or SMS message to a user associated with the client device 103. For example, the email message or SMS message may include a coupon or promotional offer. In some implementations, the email message or SMS message is sent by the message module 356.

In some implementations, the set of instructions 350 includes instructions to execute one or more applications 328. Examples of applications are discussed in the discussion of FIGS. 5B, 5C, 5D and 5E. The parsing detection module 126 executes the set of instructions 350 received from the server.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3 shows a client device, FIG. 3 is intended more as functional description of the various features which may be present in a client device than as a structural schematic of the implementations described herein. In practice, and as recognized by those of ordinary skill in the art, items shown separately could be combined and some items could be separated.

Figure 4:
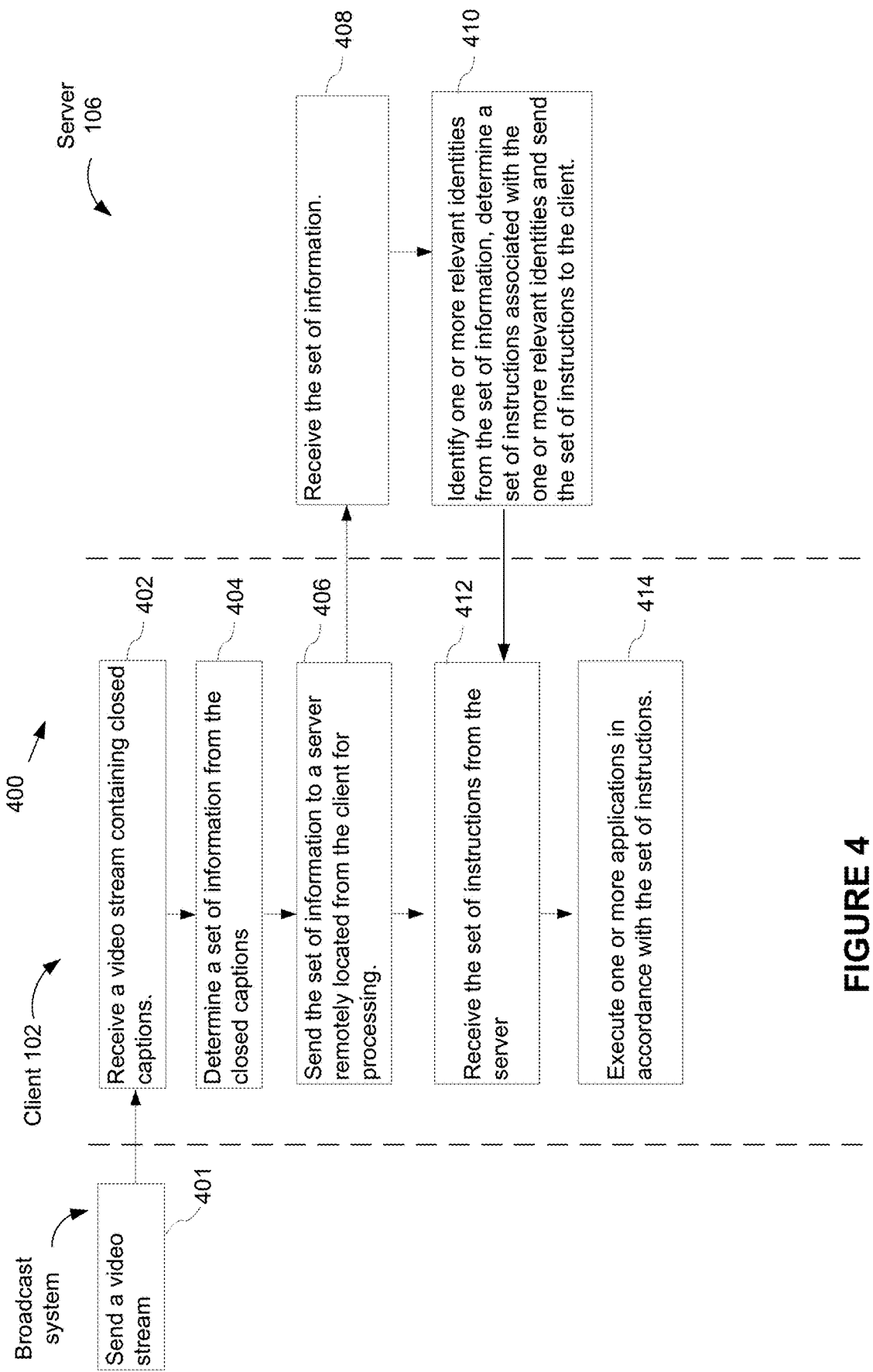
FIG. 4 is a flow chart illustrating an overview of the process of displaying information.

Attention is now directed to FIG. 4, which is a flow diagram illustrating a process 400 of displaying information, according to some implementations. FIG. 4 provides an overview of the methods described in greater detail in the discussion of FIGS. 6 and 7. A broadcast system 128 sends a video stream containing closed captions to a client 102 (401). The video stream containing closed captions is received at a client 102 (402). A set of information is determined from the closed captions (404). The set of information is sent to a server 106 remotely located from the client 102 for processing (406). The server 106 receives the set of information (408). The server 106 identifies one or more relevant identities from the set of information, determines a set of instructions associated with the one or more relevant identities and sends the set of instructions to the client 102 (410). The client 102 receives the set of instructions from the server 106 (412). The client 102 executes one or more applications in accordance with the set of instructions (414).

Attention is now directed to FIGS. 5A, 5B, 5C, 5D and 5E, which illustrate exemplary screen shots according to some implementations. FIGS. 5B, 5C, 5D and 5E illustrate applications that are executed by a client device 102. The applications in FIGS. 5B, 5C, 5D and 5E are invoked and controlled by a set of instructions determined based on the content of the closed captions 504 contained in the television program 502. As discussed in greater detail in the discussion of FIG. 6, a module (e.g., parsing module 126) on a client device 102: receives a videos steam such as a television program 502, determines a set of information from the closed captions 504 of the television program 502, sends the set of information to a server (e.g., server 106) to obtain a set of instructions, receives the set of instructions from the server and invokes one or more applications on the client device 102 in accordance with the set of instructions. The television programs 502 and applications are concurrently displayed on a display of a client device 102. The illustrations in FIGS. 5A, 5B, 5C, 5D and 5E should be viewed as exemplary but not restrictive in nature.

Figure 5A:
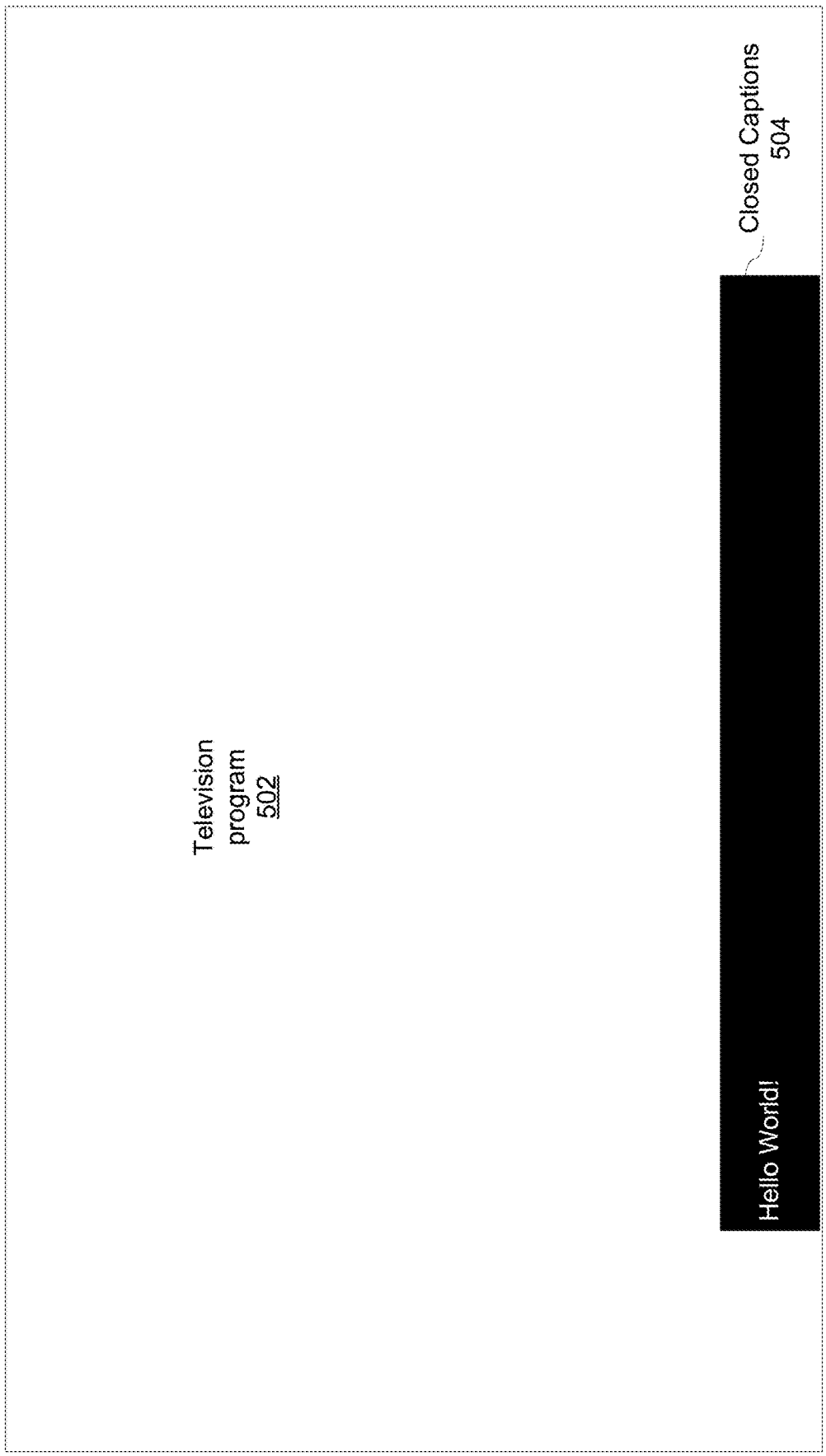
FIGS. 5A, 5B, 5C, 5D and 5E are an exemplary screenshot according to some implementations.

FIG. 5A illustrates a screen shot displaying a television program 502 that includes closed captions 504. As shown in FIG. 5A, the content of the closed captions 504 is "Hello World!" which may correspond to spoken dialogue in the television program 502.

Figure 5B:
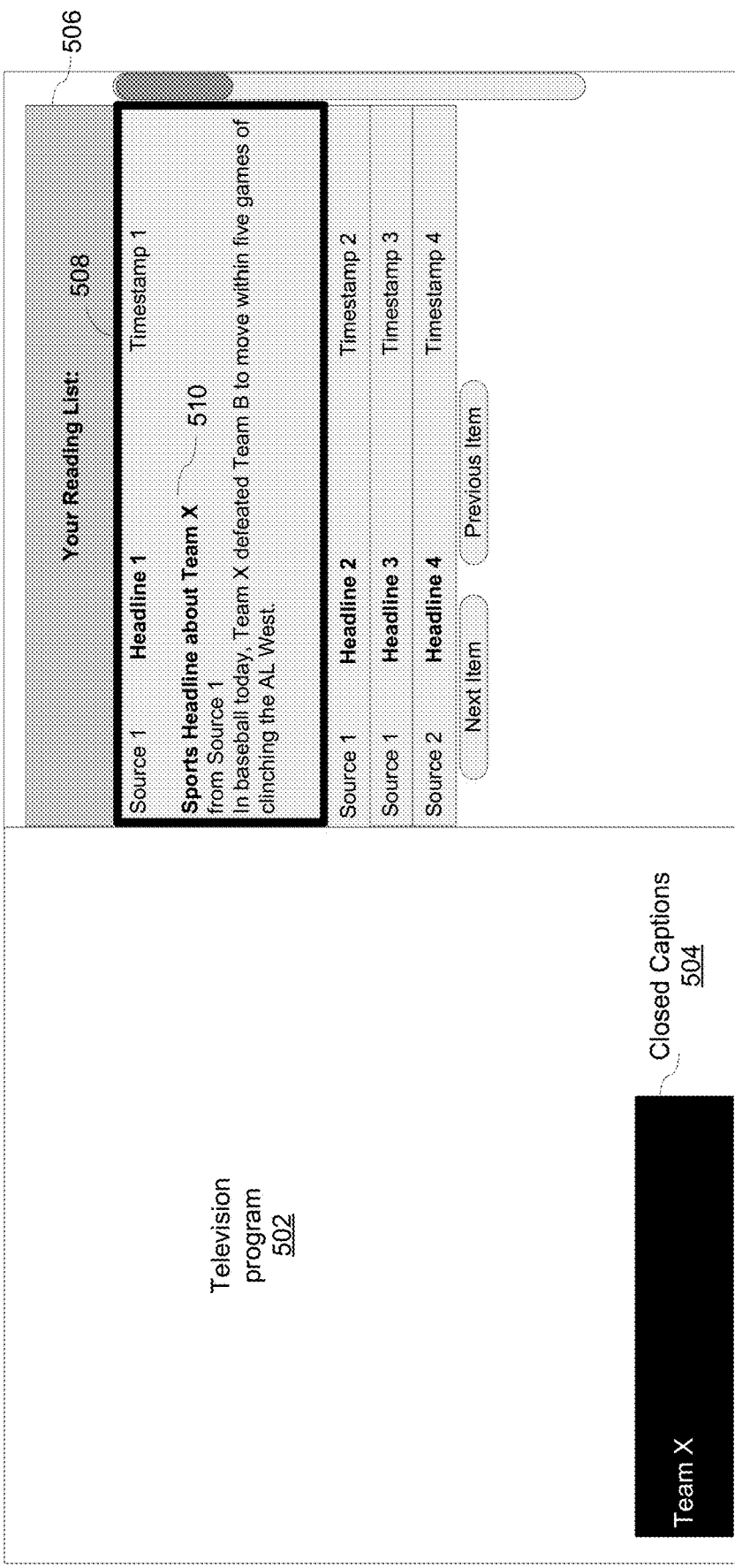

FIG. 5B illustrates a feed reader application 506 displayed adjacent to a television program 502. In the context of FIG. 5B, the parsing module 126 on the client device 102 receives the television program 502, determines a set of information from the closed captions 504 of the television program 502, sends the set of information to a server 106 to obtain a set of instructions, receives the set of instructions from the server 106 and invokes the feed reader application 506 on the client device 102 in accordance with the set of instructions received from the server 106. The feed reader application 506 displays a content feed 508. One or more content items 510 in the content feed 508 are selected by the server 106 based on information derived from the closed captions 504 contained in the television program 502. For example, a user may be watching a sports related television program 502 and when the corresponding closed captions 504 mentions a sports teams (e.g., Team X), the feed reader application 506 is invoked and the content item Sports Headline 1 510 is displayed. In the context of FIG. 5B, the content item 510 is chosen by the instruction module 118 on the server 106 based on information or instructions derived from the closed captions 504.

Figure 5C:
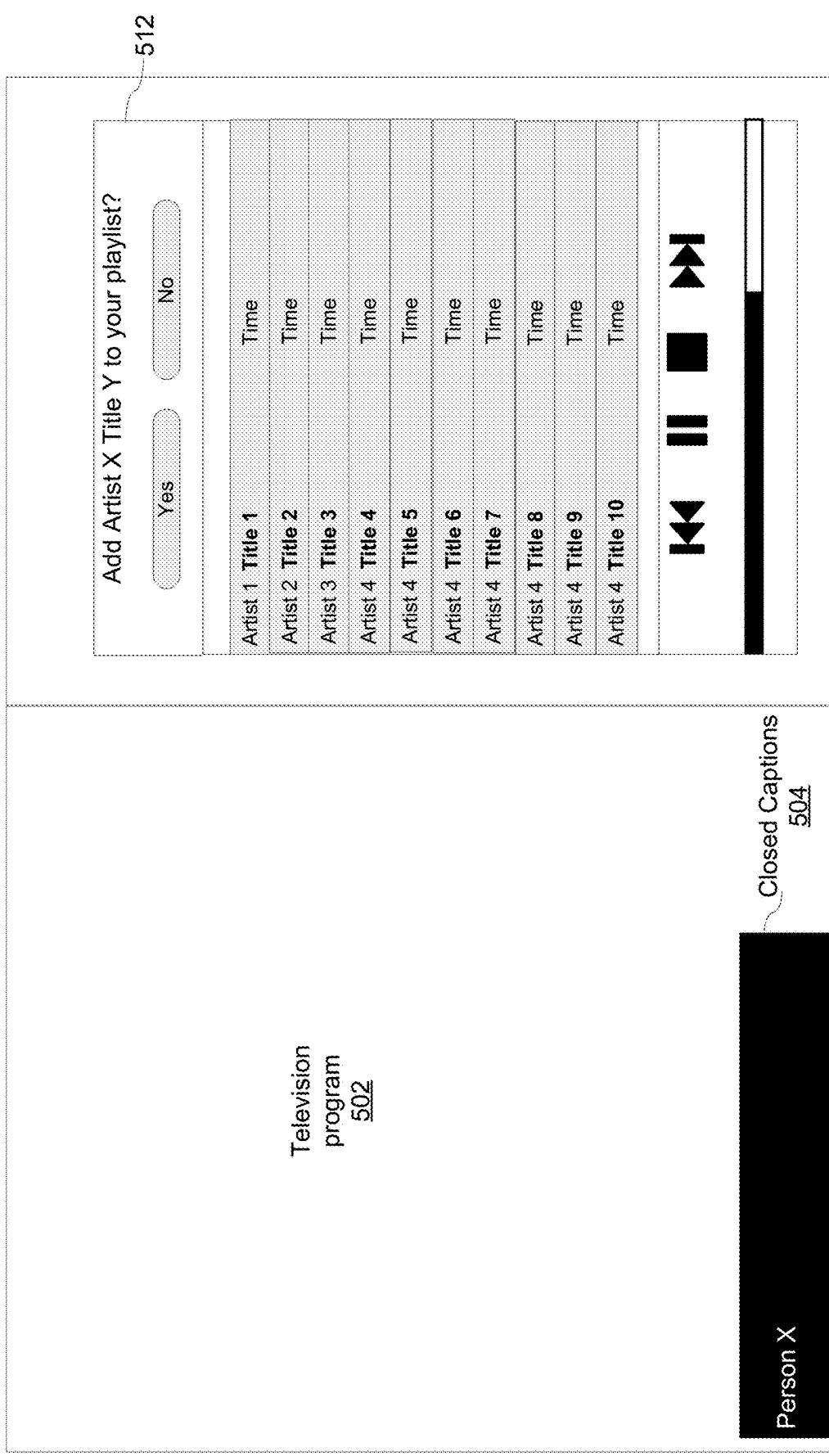

FIG. 5C illustrates a media player 512 displayed concurrently with a television program 502. In the context of FIG. 5C, the parsing module 126 on the client device 102 receives the television program 502, determines a set of information from the closed captions 504 of the television program 502, sends the set of information to server 106 to obtain a set of instructions, receives the set of instructions from the server 106 and invokes the media player 512 on the client device 102 in accordance with the set of instructions received from the server 106. The media player 512 performs one or more operations based on information derived from the closed captions 504 contained in the television program 502. For example, the closed captions 504 of the television program 502 may mention an artist and when the user views the portion of the television program 502 containing the closed captions 504 that relate to the artist, the media application 512 is invoked and the user is prompted to add a song from the artist to the user's playlist.

Figure 5D:
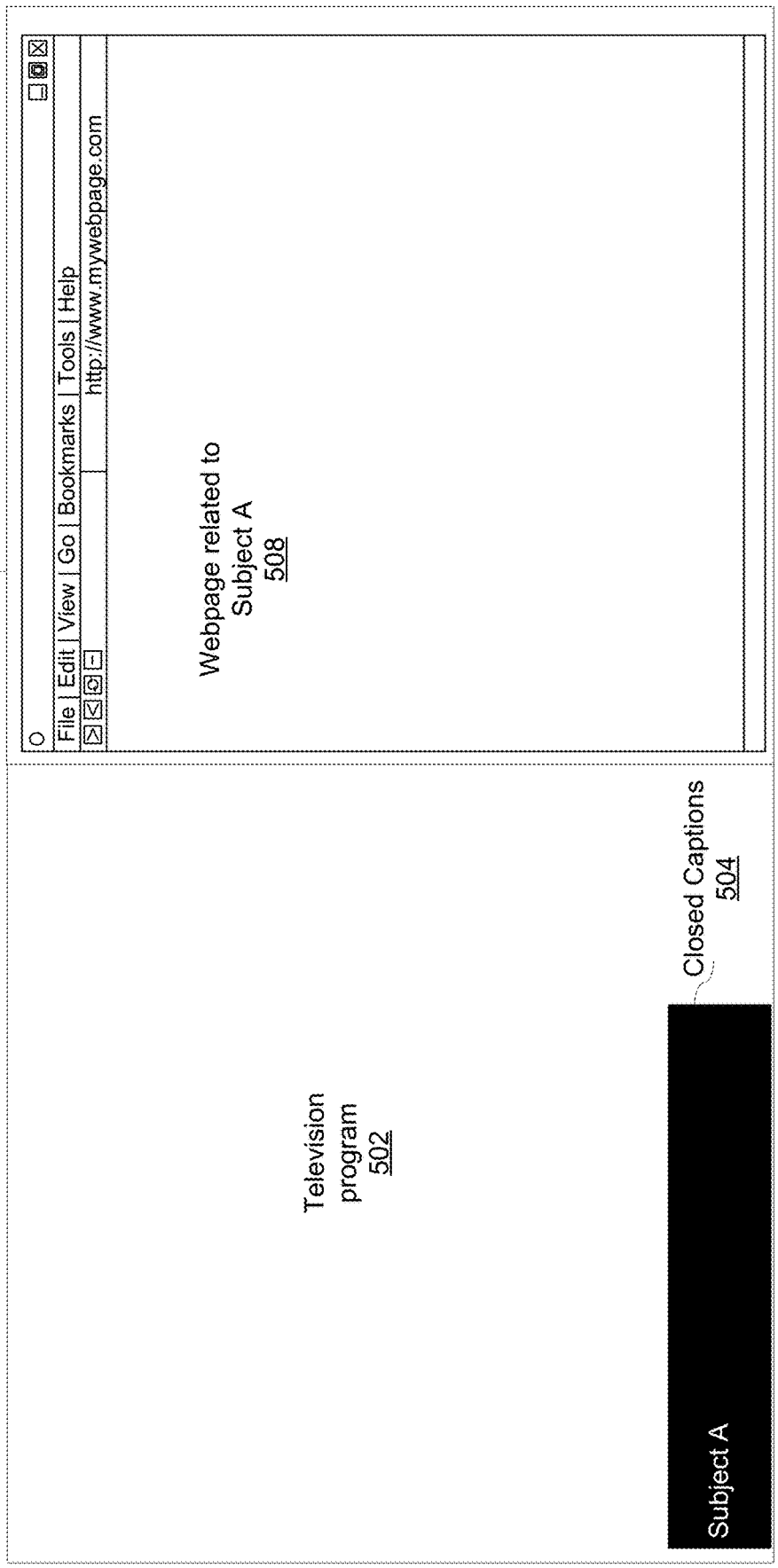

FIG. 5D illustrates a web browser 516 displayed adjacent to a television program 502. In the context of FIG. 5D, the parsing module 126 on the client device 102 receives the television program 502, determines a set of information from the closed captions 504 of the television program 502, sends the set of information to a server (e.g., server 106) to obtain a set of instructions, receives the set of instructions from the server and invokes the web browser 516 on the client device 102 in accordance with the set of instructions received from the server. In some implementations, the browser 516 displays a web page 508 chosen based on information derived from the closed captions 504 contained in the television program 502. The closed captions 504 may contain information relating to a person, place or thing. For example, the closed captions 504 may reference the name of a historical figure and when the user views the portion of the closed captions 504 containing the reference to the historical figure, the web browser 516 invokes a web page 508 (e.g., a Wikipedia page) providing information about the historical figure. In another example, the closed captions 504 may mention a product during a commercial and when the user views the portion of the closed captions 504 containing the reference to the product, the browser 516 displays a web page 508 relating to the product (e.g., a product page). When the user views the portion of the video stream containing the closed captions 504, the browser application 516 is invoked and the 506 browser is navigated to a website determined based on the content of the closed captions 504.

Figure 5E:
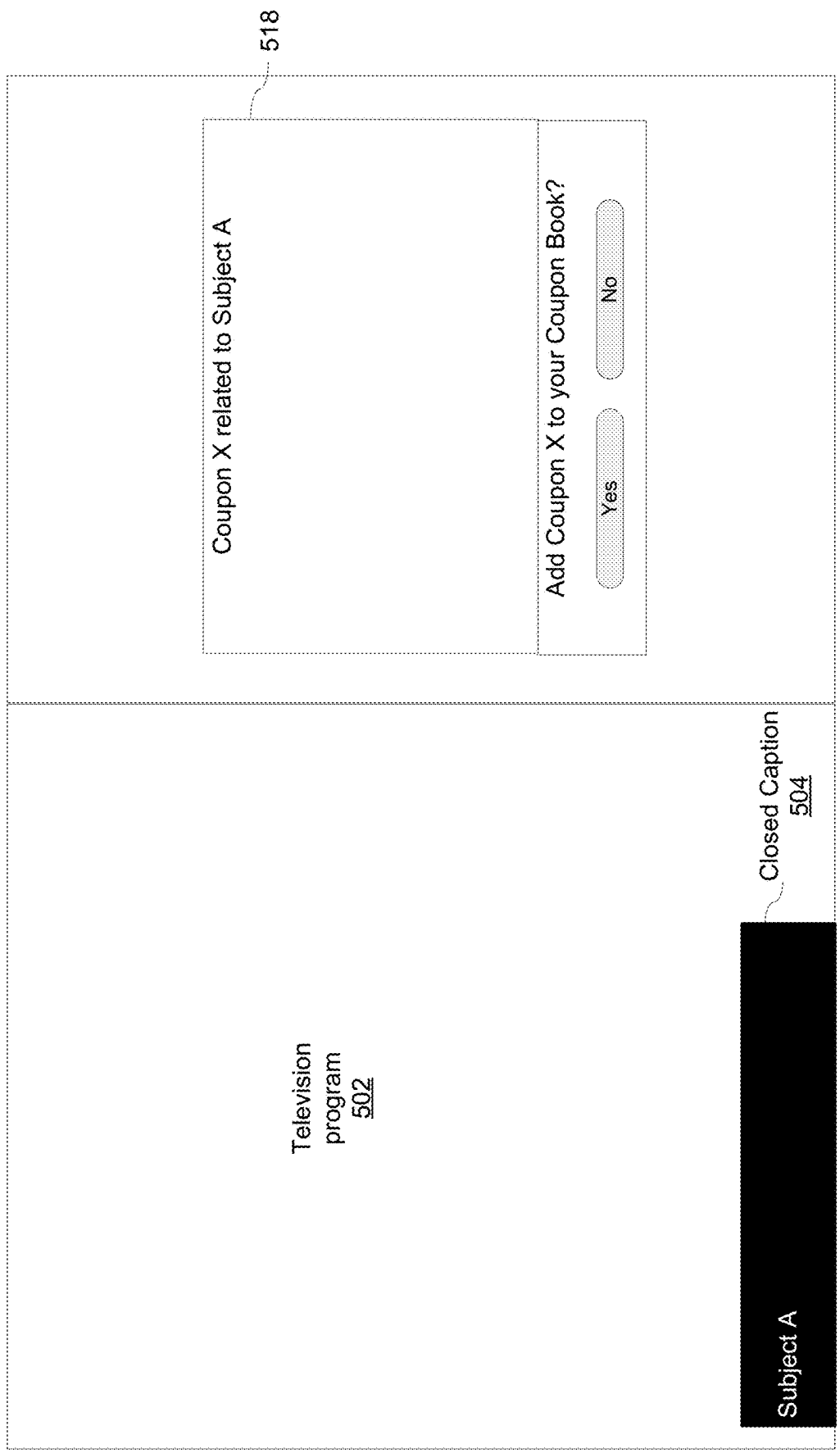

FIG. 5E illustrates a coupon book application 518. In some implementations, the coupon book application 518 performs one or more operations based on information derived from the closed captions 504. In the context of FIG. 5E, the parsing module 126 on the client device 102 receives the television program 502, determines a set of information from the closed captions 504 of the television program 502, sends the set of information to a server 106 to obtain a set of instructions, receives the set of instructions from the server 106 and invokes the coupon book application 518 on the client device 102 in accordance with the set of instructions received from the server. For example, a user may view a commercial about pearl milk tea and the closed captions 504 may mention the product. The coupon application 518 is invoked and the user is prompted to save a coupon to the user's coupon book while the user is viewing the commercial.

Figure 6:
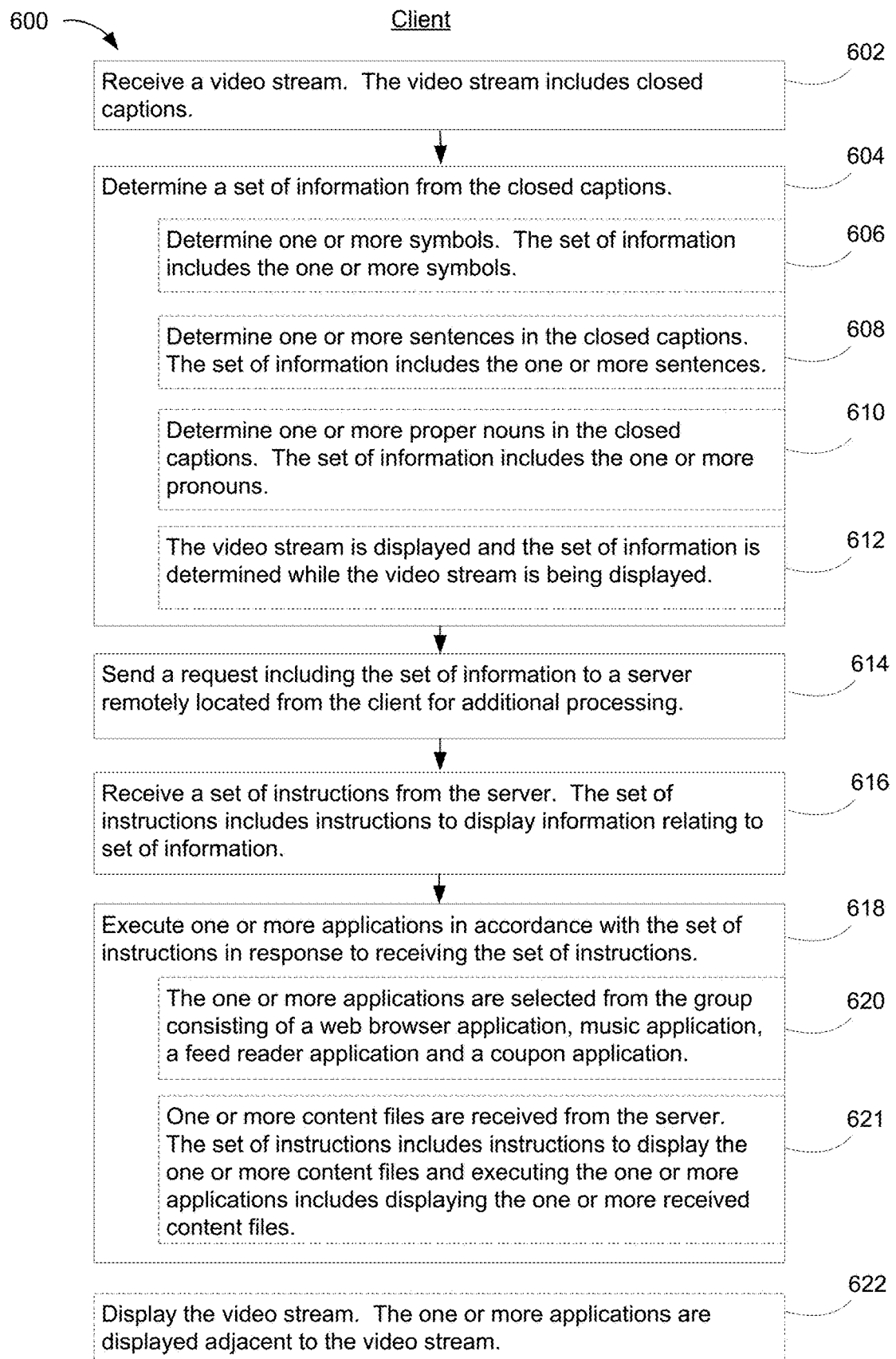
FIG. 6 is a flow chart illustrating the process of displaying information.

FIG. 6 illustrates a method 600 for displaying information. Such method is useful for broadcasters and content providers that desire to provide information and services relating to content while the content is played. Such method is useful for content viewers who desire relevant information about content they view.

Attention is now directed to FIG. 6 which is a flow diagram illustrating a method 600 of displaying information determined based on closed captions contained in a video stream. The method 600 is performed at a client device 102 having one or more processors and memory. A video stream including closed captions is received (602). For example, the video stream may correspond to a television program, movie or commercial with closed captions that relate to and are coordinated with the video content. In some implementations, the video stream is received by the video input 350, the TV tuner 352 or the network interface 308 of the client device 102. In some implementations, the video stream is received from the broadcast system 128. For example, the video stream may be received over a network connection, a satellite receiver, a cable box or by an over-the-air antenna.

A set of information 350 is determined from the closed caption (604). In some implementations, the set of information 350 includes information from the content of the closed captions. For example, the set of information 350 may include text from the content of the closed captions. In some implementations, the set of information 350 consists of alphabet characters, numbers, symbols or any combination thereof. The set of information 350 is determined by the parsing module 126.

In some implementations, the determining includes determining one or more symbols and the set of information 350 includes the determined one or more symbols (606). Stated in another way, in some implementations, the parsing module 126 parses the content of the closed captions to determine one or more symbols and includes the determined one or more symbols in the set of information 350. In some implementations, the determining includes determining one or more symbols and a predefined amount of text following the symbol. The one or more symbols and predefined amount of text following the symbol are included in the set of information 350. For example, a broadcaster or content provider may insert a "#" symbol into the closed captions of a video stream to signal that text following the symbol is information from which instructions should be derived. For example, a closed caption may include "#actor person x" to indicate that person x is an actor. In some implementations, the text following the symbol may include instructions or information from which instructions should be derived. For example, the parsing module 126 detects and parses the string "#browser URL" from the closed caption and includes the parsed string into the set of information 350. The parsing module 126 sends the set of information 350 including the parsed string to a server 106 and in response receives a set of instructions 358. The set of instructions 358 corresponding to the parsed string may invoke a web browser on the client device 106 and open a webpage corresponding to the URL in the parsed string. A content provider may insert special characters or symbols in the closed captions of a video stream in order to provide information relating to the video stream. The relevant information is displayed concurrently with the video stream.

In some implementations, the determining includes determining one or more sentences in the closed captions and the set of information 350 includes the determined one or more sentences (608). The parsing module 126 parses to content of the closed captions to determine one or more sentences and includes the determined sentences in the set of information 350. For example, the parsing module 126 may detect sentences by detecting periods or other punctuation marks in the content of the closed captions.

In some implementations, the determining includes determining one or more proper nouns in the closed captions and the set of information 350 includes the one or more pronouns (610). The parsing module 126 parses the content of the closed captions to determine one or more proper nouns and includes the determined one or more proper nouns in the set of information 350. In some implementations, the one or more proper nouns are selected if they match one or more proper nouns stored in the parsing module 126. The proper nouns may correspond to a person, place or thing. For example, the parsing module 126 may parse the content of the closed captions to determine the names of one or more people, the name of a product or company or the name of a country. In some implementations, the parsing module 126 selects capitalized words in the closed captions and includes the capitalized words in the set of information 350.

In some implementations, the video stream is displayed and the set of information 350 is determined while the video stream is being displayed (612). The video stream is displayed on the display 313 of the client device 102. A request 220 including the set of information 350 is sent to a server 106 remotely located from the client 102 for processing (614). The processing determines a set of instructions 358 based on the set of information 350. The set of instructions 358 include instructions to display information relating to the closed captions of a video stream to be displayed. The request 358 is generated and sent by the request module 352.

A set of instructions 358 is received from the server (616). The set of instructions 358 includes instructions to display information relating to the set of information 350 (616). In some implementations, the set of instructions 358 is contained in a content feed. The set of instructions 258 is received by the parsing module 126.

One or more functions and/or applications are executed in accordance with the set of instruction 358 in response to receiving the set of instructions 350 (616). In some implementations, the one or more applications are selected from the group consisting of a media application, a feed reader application, a browser application and a coupon book application (620). For example, as shown in FIG. 5C, set of instructions 358 may invoke a media player application 512 and prompt the user to add a song to the user's playlist. In some implementations, the video stream is displayed and the one or more applications are displayed adjacent to the video steam (622). For example, as shown in FIG. 5B, a feed reader application 508 is displayed concurrently with a television program 502. The one or more applications are discussed in greater detail in the discussion of FIGS. 5B, 5C, 5D and 5E. The one or more applications are executed by the parsing module 126.

In some implementations, one or more content files are received from the server (621). The set of instructions 358 includes instructions to display the one or more content files and executing the one or more applications includes displaying the one or more received content file (621). For example, a web page may be received and the set of instructions 358 includes instructions to invoke a web browser to display the webpage.

In some implementations, the set of instructions 358 includes instructions to display a message. The content of the message relates to the set of information 350. For example, a URL for a product's website may be displayed or a snippet of information relating to a television program may be displayed. In some implementations, the set of instructions 358 includes instructions to send a message (e.g., email or SMS) to a user associated with the client 102. For example, the message may include a coupon, a link to a coupon, a song, a link to a song, information about a television program or movie and links to information. The message module 356 displays and sends messages.

Figure 7:
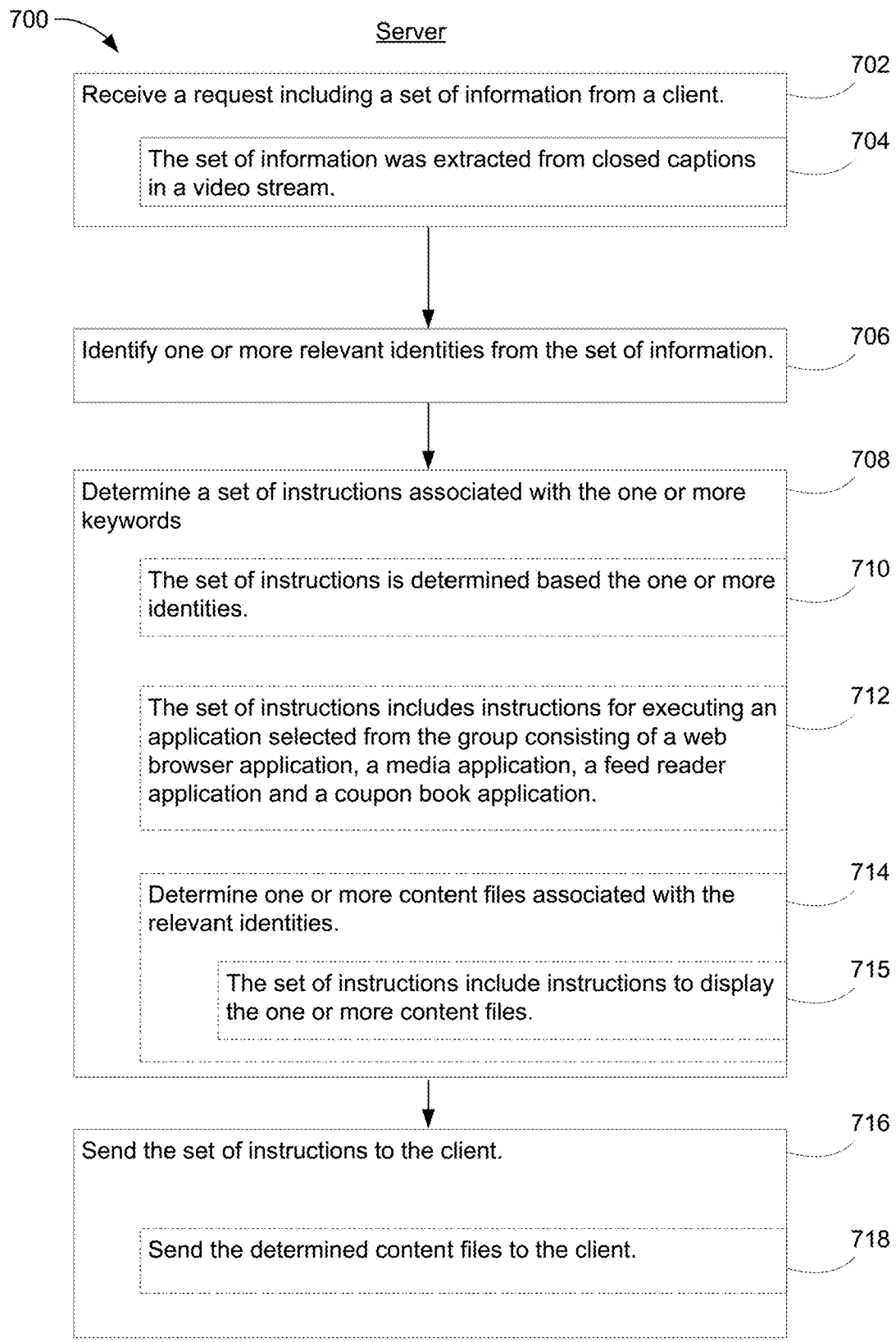
FIG. 7 is a flow chart illustrating the process of determining a set of instructions based on a set of information extracted from closed captions.

FIG. 7 is a flow diagram illustrating a method 700 of generating a set of instructions based on information derived from closed captions. The method 700 is performed at a server system 106 having one or more processors and memory. In some implementations, a request 220 including a set of information 350 is received from a client 102 (702). In some implementations, the request 220 includes a user identifier. The set of information 350 was extracted from closed captions in a video stream (704). One or more relevant identities 234 are identified from the set of information 350 (704). In some implementations, a plurality of relevant identities are identified using the set of information 350 and a subset of the plurality of relevant identities are selected based on the importance metric 242 associated with the relevant identities. For example, the identification module 114 may select the relevant identity with the highest importance metric 242. In some implementations, the one or more relevant identities 234 are determined in response to receiving the request 220. The identification module 114 matches information in the set of information 350 to one or more identities 234 in the identity database 130. The one or more relevant identities 234 may correspond to a person, place or thing.

A set of instructions 358 associated with the set of information is determined (708). In some implementations, the set of instructions 358 is determined in response to receiving the request 220. In some implementations, the set of instructions 358 is determined based on the identified one or more relevant identities 234 (710). In some implementations, a relevant identity 234 includes a plurality of associated actions. For example, a relevant identity 234 may be the name of a basketball player and the associated actions include displaying a video highlight of the basketball player's most recent game or displaying a web page about the basketball player. The instruction module 118 selects one or more of the plurality of associated actions based on user preferences 250 for the user corresponding to the user identifier 246. For example, the user's information may include preferences that indicate categories of information that the user is or is not interested in. For example, a relevant identity 234 may be the name of a person who is an actor, athlete and musician and the user's preference may indicate an affinity towards sports and music. In this example, the resulting set of instructions 358, in one implementation, would be related to the person's activity as a musician or athlete. In some implementations, the user's preferences indicate applications the user likes or dislikes. For example, a user may have an affinity towards receiving coupons via a coupon application and content items via a feed reader application.

In some implementations, the set of instructions 358 is determined based on one or more content files associated with the identified one or more relevant identities 234. In some implementations, one or more content files associated with the relevant identities are determined by the identification module 114 (714). The set of instructions 358 include instruction to display the one or more content files (714). In some implementations, the identification module 114 identifies the one or more content files by searching the content database 122 using the name of the identity as a query. For example, one of the relevant identities 234 may be the name of a product and one or more coupons may be associated with the product. In another example, one of the relevant identities 234 may be a musician and the identification module 114 identifies a song by the musician from the content database 122. In some implementations, the associated actions 244 for a respective identity specify one or more content files. The instruction module 118 searches for the specified content files in the content database 122 and selects a content file in accordance with a metric associated with the content files. For example, the instruction module 118 may select a content filed based on the popularity of the files. After the instruction module 118 identifies a content file, the instruction module determines an application to display or play the content file and generates a set of instructions 358 that causes the determined application to display the content file.

In some implementations, the set of instructions 358 include instructions for executing an application selected from the group consisting of a media application, a feed reader application, a browser application and a coupon book application (712).

In some implementations, the set of instructions 358 includes instructions to display a message on the client device 102. The content of the message relates to the set of information 350. For example, a URL for a product's website may be displayed or a snippet of information relating to a television program may be displayed. In some implementations, the set of instructions 358 includes instructions to send a message (e.g., email or SMS) to a user associated with the client. The message may include a coupon, a link to a coupon, a song, a link to a song, information about a television program or movie and links to information. The set of instructions 358 is generated by the instruction module 118.

The set of instructions 358 is sent to the client 102 (716). In some implementations, the set of instructions 358 is sent in a content feed. In some implementations, one or more content files are sent along with the one or more instructions (718). For example, a playlist, media file, advertisement or feed stored in the content database 122 may be sent along with the set of instructions 358. The set of instructions 358 and optionally the one or more content files are sent by the instruction module 118.

Each of the methods described herein may be governed by instructions that are stored in a non-transitory computer readable storage medium and that are executed by one or more processors of one or more servers (e.g., server system 106). Each of the operations shown in FIGS. 6 and 7 may correspond to instructions stored in a computer memory or computer readable storage medium.

The foregoing description, for purpose of explanation, has been described with reference to specific implementations. However, the illustrative discussions above are not intended to be exhaustive or to limit the methods and systems to the precise forms disclosed. Many modifications and variations are possible in view of the above teachings. The implementations were chosen and described in order to best explain the principles of the methods and systems and their practical applications, to thereby enable others skilled in the art to best utilize the techniques and devices described herein and various implementations with various modifications as are suited to the particular use contemplated.

Moreover, in the foregoing description, numerous specific details are set forth to provide a thorough understanding of the present implementation. However, it will be apparent to one of ordinary skill in the art that the methods described herein may be practiced without these particular details. In other instances, methods, procedures, components, and networks that are well known to those of ordinary skill in the art are not described in detail to avoid obscuring aspects of the present implementation.

What is claimed is:

1. A method, comprising:
at a computer system having one or more processors and memory storing one or more programs to be executed by the one or more processors:
identifying a set of first information in closed captions of a video stream configured to be displayed to a user of a computing device;
searching an identity database using the set of first information as search queries, wherein the identity database stores a plurality of identities, each identity being associated with at least a name and an importance metric, and wherein searching the identity database further includes identifying one or more identities in the identity database based on the respective importance metrics of the one or more identities;
obtaining second information of one or more content files related to the one or more identities identified in the identity database; and
in response to obtaining the second information of the one or more content files, without user intervention, generating instructions to invoke an application for presenting the second information of the one or more content files to the user of the computing device.

2. The method of claim 1, wherein searching the identity database using the set of first information as the search queries further comprises:
identifying a list of proper nouns in the set of first information; and
constructing a search query with each proper noun in the list of proper nouns.

3. The method of claim 1, further comprising:
receiving a request for information related to the video stream from the computing device, the request including the set of first information parsed from the closed caption of the video stream.

4. The method of claim 1, wherein each of the one or more identities are identified in accordance with a determination that the respective importance metric is above a predetermined threshold.

5. The method of claim 1, wherein the one or more identities are identified as a number of top identities among a set of identities relevant to the set of first information.

6. The method of claim 1, wherein the one or more identities are identified in the identity database in accordance with preferences associated with the user of the computing device.

7. The method of claim 6, wherein the one or more identities includes a sports related identity, further comprising:
selecting the sports related identity based on the user's preference to sports.

8. The method of claim 1, wherein generating instructions further comprises:
generating instructions in accordance with preferences associated with the user of the computing device, wherein the preferences includes at least one of a preference of the user for a first media content application over a second media content application and a preference of the user for a first type of media content over a second type of media content.

9. The method of claim 1, wherein the instructions further includes instructions for causing the application to be invoked for displaying the one or more content files on a second display device to the user of the computing device concurrently with displaying of the video stream on a first display device that is distinct from the second display device, and wherein the first display device and the second display device are selected from: a TV screen, an LCD display, an LED display, and a touchscreen display.

10. The method of claim 1, wherein the name of each identity in the identity database is a person, place or thing, and the second information of the one or more content files includes a link to a web page about the person, place or thing identified by the noun.

11. A computer system, comprising:
one or more processors; and
memory storing one or more programs for execution by the one or processors, wherein the one or more programs comprising instructions for:
identifying a set of first information in closed captions of a video stream configured to be displayed to a user of a computing device;
searching an identity database using the set of first information as search queries, wherein the identity database stores a plurality of identities, each identity being associated with at least a name and an importance metric, and wherein searching the identity database further includes identifying one or more identities in the identity database based on the respective importance metrics of the one or more identities;
obtaining second information of one or more content files related to the one or more identities identified in the identity database; and
in response to obtaining the second information of the one or more content files, without user intervention, generating instructions to invoke an application for presenting the second information of the one or more content files to the user of the computing device.

12. The computer system of claim 11, wherein the set of first information includes a noun corresponding to a person, and the first information of the one or more content files includes a media playlist of media items associated with the person identified by the noun.

13. The computer system of claim 11, wherein the one or more content files are selected from a group consisting of web pages, video clips, pictures, songs and news stories that the one or more identities are associated with, and the one or more content files are determined as interesting according to a user based metrics associated with the content files.

14. The computer system of claim 11, wherein the set of first information includes non-speech information extracted from the closed captions.

15. The computer system of claim 11, wherein the set of first information includes a symbol extracted from the closed captions, one or more visually emphasized words in the closed captions, or one or more special characters and a predefined amount of text following the one or more special characters.

16. A non-transitory computer readable storage medium storing one or more programs configured for execution by one or more processors of a computer system, the one or more programs comprising instructions for:
identifying a set of first information in closed captions of a video stream configured to be displayed to a user of a computing device;
searching an identity database using the set of first information as search queries, wherein the identity database stores a plurality of identities, each identity being associated with at least a name and an importance metric, and wherein searching the identity database further includes identifying one or more identities in the identity database based on the respective importance metrics of the one or more identities;
obtaining second information of one or more content files related to the one or more identities identified in the identity database; and
in response to obtaining the second information of the one or more content files, without user intervention, generating instructions to invoke an application for presenting the second information of the one or more content files to the user of the computing device.

17. The non-transitory computer readable storage medium of claim 16, wherein the set of first information includes at least one sentence extracted from the closed captions.

18. The non-transitory computer readable storage medium of claim 16, wherein the applications is invoked to present the one or more content files to the user of the computing device concurrently with the video stream.

19. The non-transitory computer readable storage medium of claim 16, wherein each of the plurality of relevant identities is associated with a respective action, and the applications is identified according to the respective actions associated with the one or more identities.

20. The non-transitory computer readable storage medium of claim 16, wherein the instruction includes instructions for executing the application based on a type of the one or more content files, wherein the application include at least one of: a web browser, a music application, a feed reader application, a coupon application, and a content viewer.

* * * * *